United States Patent Office 3,766,275
Patented Oct. 16, 1973

3,766,275
PROCESS FOR PREPARING A DITHIOL-BUTANEDIOL
Joseph P. Ciaudelli, Ramsey, N.J., assignor to Avon Products, Inc.
No Drawing. Filed Mar. 15, 1971, Ser. No. 124,529
Int. Cl. C07c *149/18*
U.S. Cl. 260—609 R    11 Claims

ABSTRACT OF THE DISCLOSURE

The method of making a 1,4-dithiol-2,3-butanediol and corresponding mercaptides by reacting butadiene dioxide with hydrogen sulfide in a non-aqueous solvent in the presence of an alkaline catalyst while maintaining the temperature within the range of from about 15° to 40° C., the ratio of said solvent to said dioxide, by volume, being at least about 5:1, and separating the 1,4-dithiol-2,3-butanediol formed.

BACKGROUND OF THE INVENTION

The reaction between monoepoxides and hydrogen sulfide to produce mercaptoalkanols is known and has been carried out under atmospheric and superatmospheric conditions. The yields, however, have been low due to many side reactions that take place. The difficulties have been greater with respect to diepoxides reacted with hydrogen sulfide in that the use of high temperatures and/or pressures are necessary resulting in some polymerization and again in low yields of the desired dithiol compound. Moreover, many of the present procedures require multi-step reactions where intermediates must first be formed before the final dithiol compound is obtained, thus making such processes commercially undesirable. The result has been that dithiols are expensive to manufacture and their use has been limited.

SUMMARY OF THE INVENTION

It has now been found that 1,4-dithiol-2,3-butanediols and corresponding mercaptides can be produced in high yield at atmospheric pressure without need for the formation of intermediates.

Briefly, the present invention comprises the method of making a 1,4-dithiol-2,3-butanediol comprising reacting butadiene dioxide with hydrogen sulfide in a non-aqueous solvent in the presence of an alkaline catalyst while maintaining the temperature in the range of from about 15° to 40° C., the ratio of said solvent to said dioxide, by volume, being at least about 5:1, and separating the 1,4-dithiolbutanediol formed. In forming the mercaptide, the separated dithiolbutanediol is reacted with a water-soluble metal compound until reaction is complete and the resultant metal salt, or mercaptide is separated.

DETAILED DESCRIPTION

The critical aspects of the instant process are control of the temperature and the ratio of solvent used. Both must be within the ranges hereinafter set forth in order to obtain the 1,4-dithiol-2,3-butanediol in the high yields.

With respect to the reaction temperature, it must be maintained below about 40° C. since temperatures thereabove tend to cause polymerization, thereby limiting the yield of dithiolbutanediol desired. While the lower limits of the temperature range are not as critical, for efficient reaction it must be at least about 15° C., with the preferred temperature range being 25°–30° C. Since the reaction between the dioxide and hydrogen sulfide is exothermic the reaction mixture must either be cooled or the reaction carried out at a rate to maintain the temperature within the range noted. It is preferred to cool the reaction mixture in order to have the reaction proceed more rapidly.

It has also been found that the ratio of solvent to butadiene oxide is critical and there must be at least five parts by volume of the solvent for each part by volume of the dioxide. In fact, it is preferred to have at least 12 parts by volume of the solvent for each part of the dioxide. The upper limit in this volume ratio is not critical and is governed simply by commercial conditions. That is to say, there is no need to exceed about 20 parts by volume of the solvent for each part by volume of the dioxide, since this only increases problems due to the handling of large volumes of solvent, requires the use of larger equipment, and the like. The lower limit is, however, critical, in that under the reaction temperature conditions volume ratios much below 5:1, as noted above, will not give the desired product.

As to materials, the butadiene dioxide and hydrogen sulfide used are those commercially available.

The solvent must be inert in that it will not take part in the reaction and must be a solvent for the materials reacted and the resultant dithio compound formed. Alcohols such as methanol, ethanol, propanol, butanol, and mixtures thereof, are preferred, although other solvents such as dimethylformamide can be used.

As for the catalyst used, it is preferably an aryltrialkylammonium hydroxide or a sodium sulfhydrate. Examples of the suitable hydroxides are the benzyltrimethylammonium hydroxide and benzyltriethylammonium hydroxide. Catalysts used in the reaction of monoepoxides and hydrogen sulfide can also generally be used. Examples are triethylenetetramine; piperidine; cyclohexylamine: n-butylamine: sodium hydrosulfide: dialkylamines such as diethylamine and dimethylamine: trialkylamines, such as trimethylamine, triethylamine, tri-n-propylamine, tri-n-butylamine; and mixtures thereof.

As to proportions, it is preferred to use stoichiometric amounts, that is, 2 mols of hydrogen sulfide for each mol of the butadiene dioxide. If desired, a molar excess of hydrogen sulfide can be used but is not required for optimum results. The solvent is used in the amounts set for the above and the catalyst amounts can vary widely with as little as 5% by weight of catalyst, based on the weight of the butadiene dioxide being sufficient.

In carrying out the reaction, it is preferred to first saturate the solvent with hydrogen sulfide and then to incrementally add the butadiene dioxide thereto while maintaining the temperature within the range of about 15°–40° C. as by cooling the reaction vessel. The addition rate of the butadiene dioxide can be as rapid as the efficiency of cooling permits the temperature to be maintained within the cited range. Since the reaction is an exothermic one, termination of the reaction is readily determined as that point where the temperature drops in the reaction vessel. While the reverse addition reaction of adding hydrogen sulfide into a solution of the butadiene dioxide can be used, somewhat lower yields are obtained. Thus, it is preferred to first form the solution of the hydrogen sulfide in the solvent with the catalyst and to add the butadiene dioxide thereto. After the reaction is completed, the resultant dithiolbutanediol is separated from the solvent as by vacuum distillation.

When a salt (mercaptide) is to be formed the dithiolbutanediol is admixed with a water-soluble metal compound and an exothermic reaction occurs. When the reaction is completed the resultant metal mercaptide is separated from the reaction mixture as by evaporation or solvent extraction. The preferred metal compounds are the alkaline earth metal and alkali metal hydroxides such as sodium, potassium and calcium hydroxide. Also suitable are metal salts such as zinc sulfate, zinc nitrate, lead nitrate, and the like and the metal esters such as lead acetate, lead formate, zinc lactate, and the like.

The 1,4-dithiolbutanediol formed can be used to wave hair or to depilate by being applied to hair. The dithiolbutanediol formed is predominantly DL-dithiothreitol with minor amounts of dithioerythritol also being formed. The metal mercaptides also have the same activity with respect to hair.

The invention will be further illustrated in connection with the following examples which are set forth for purposes of illustration only.

Example 1

Four hundred cc. of methanol and 5.4 cc. (40% sol. in methanol) of N-benzyltrimethylammonium hydroxide were placed in a 3-neck reaction vessel fitted with a gas inlet tube connected to a hydrogen sulfide cylinder, a dropping funnel, a condenser fitted with a gas outlet tube for excess hydrogen sulfide gas, and a magnetic stirrer. The hydrogen sulfide was bubbled in the methanol solution for one hour after which 50 cc. (55 grams) of butadiene dioxide in 50 cc. of methanol was added dropwise over 3–3.5 hour period. The stirring of the mixture and the addition of hydrogen sulfide were continuous during this time. Also, the temperature of the reaction mixture was maintained at 30–32° during the addition of the butadiene dioxide. After the addition of the butadiene dioxide the hydrogen sulfide was bubbled in for an additional hour. After the temperature of the mixture decreased, nitrogen was bubbled in to remove the excess hydrogen sulfide in the reaction mixture. The methanol was then distilled off at atmospheric pressure. The flask was then fitted for a vacuum distillation and the desired dithiothreitol was distilled over at 174° at 14.5 mm. of pressure. A yield of 74.94 grams of material was obtained out of a possible 99.7 grams (approximately 73% yield).

Example 2

The reaction vessel and conditions of Example 1 were used to make a series of runs in which the solvent dilution, addition time, and addition temperature were varied. The results are set forth in the table below.

| Solvent dilution | Addition time, hr. | Moles of butadiene | Addition temperature, °C. | Yields, percent |
|---|---|---|---|---|
| 12:1 | 1 | 0.258 | 28–30 | 80.7 |
| 8.7:1 | 2 | 0.646 | 28–31 | 75.2 |
| 2:1 | 1½ | 0.255 | 25–29 | 41.5 |
| 17:1 | 1½ | 0.143 | 20–25 | 83.3 |

It will be noted that when the solvent dilution was below 5:1 a very low yield was obtained.

Example 3

The reaction vessel and conditions of Example 1 were used except that the hydrogen sulfide was bubbled into a solution of butadiene diepoxide and catalyst. Specifically, hydrogen sulfide was bubbled through a 8:1 solution (volume/weight) of methanol to butadiene diepoxide containing a 0.5 ml. of 40% methanolic benzytrimethyl ammonium hydroxide over a three hour period. The temperature was maintained between 15–30° C. After reaction the methanol was distilled off and the residue vacuum distilled into three fractions.

| Fraction | Pot. temp. (°C.) | Vap. temp. (°C.) | Vacuum (mm.) | Wt. o prod. (gm.) |
|---|---|---|---|---|
| I | 128 | (1) | 0.3 | 0.65 |
| II | 128–150 | 107–116 | 0.15–0.3 | 11.27 |
| III | 150–180 | 116–118 | 0.1–0.15 | 0.82 |

1 To 107.

All three fractions represented at 70.6% yield. Infrared Spectrophotometric analyses showed absorbance similar to 1,4-dithiothreitol.

Example 4

The reaction vessel and conditions of Example 1 were used except that sodium sulfhydrate was used as the catalyst.

To 200 cc. methanol (absolute) was added 1.0 gram of sodium sulfhydrate (NaSH—3H$_2$O). This solution was saturated with hydrogen sulfide and then butadiene diepoxide solution [0.258 mole (22.2 g.) in 20 ml. methanol] was added over a two hour period dropwise. The temperature was maintained between 22–30° by external water bath. Hydrogen sulfide was added for an additional 3 hours after addition of butadiene diepoxide. The reaction was then sealed and sat overnight. Methanol was removed by distillation at atmospheric pressure following a nitrogen purgation for 30 minutes. The residue was vacuum distilled into four fractions giving an 81.5% yield of 1,4-dithiol-2,3-butanediol.

| Fraction | Pot temp. | Vap. temp. | Vac., mm. | Wt. | —SH assay |
|---|---|---|---|---|---|
| I | 133–136 | 122.5–123.5 | 5.5–6 | 15.26 | 87.7 |
| II | 136–139 | 123.5–125.5 | 5.5–6 | 9.99 | 92.7 |
| III | 139–165 | 125–140 | 5.5–6 | 5.00 | 93.9 |
| IV | 165–209 | 140–170 | 1.0 | 2.20 | 90.2 |

Example 5

A series of reactions is run following the procedure of Example 1 except that there is substituted for the methanol used therein, separately and in turn, an equal volume of each of the following: ethanol, propanol, butanol, dimethylformamide, mixture of methanol and ethanol, mixture of propanol and butanol, and mixture of methanol and dimethylformamide. In each case high yields of 1,4-dithiol-2,3-butanediol are obtained.

Example 6

A five gram portion of dithiothreitol (94% active) formed according to the process set forth above was titrated with 34 ml. of 2 N sodium hydroxide solution. The end point was determined by a pH meter. The clear solution was concentrated on a rotary vacuum evaporator to an off-white solid. Trituration under ethanol of the solid followed by vacuum filtration yielded a colorless white solid product (the disodium salt of dithiothreitol) which was dried under a vacuum. A 0.10 gram sample in 5 ml. of water (2% solution) had a pH of 11.45. A 0.10 gram sample in 10 ml. of water (1% solution) gave a pH of 11.15. A solution of this disodium salt of dithiolbutanediol actively reduces a potassium ferricyanide solution.

Example 7

To a beaker containing 38.65 grams of 88% active 1,4-dithiol-2,3-butanediol was added 111.8 ml. of 3.944 N sodium hydroxide solution. The resulting solution was poured into a liter of stirring acetone. A lower liquid layer formed which slowly solidified to a semisolid consistency. Decantation of the acetone and replacement with 1500 ml. of fresh acetone caused formation of a solid product which became powdery or granular on continued stirring. The salt was filtered by vacuum suction and dried under vacuum in a desiccator. The dried salt had a neutralization equivalent of 135.7 by a potassium ferricyanide titration. This neutral equivalent corresponds to the tetrahydrate of the disodium salt of the dithiolbutanediol. Analysis of a sample gave 17.4 percent sodium and 26.8 percent water.

Example 8

A series of reactions is run following the procedure of Example 6 except that the sodium hydroxide used therein is replaced, separately and in turn, by an equivalent amount of calcium hydroxide, potassium hydroxide, lead acetate, and zinc sulfate. In each case the corresponding metal mercaptide is formed.

What is claimed is:

1. The method of making a 1,4-dithiol-2,3-butanediol comprising reacting butadiene dioxide with hydrogen sulfide in a non-aqueous inert solvent therefor in the presence of an alkaline catalyst while maintaining the temperature in the range of from about 15° to 40° C., the ratio of said solvent to said dioxide, by volume, being at least about 5:1, and separating the 1,4-dithiol-2,3-butanediol formed.

2. The method of claim 1 wherein the solvent is first saturated with the hydrogen sulfide and the butadiene dioxide then incrementally added thereto.

3. The method of claim 2 wherein the ratio of solvent to dioxide is at least about 12:1 and the reaction temperature is from 25° to 30° C.

4. The method of claim 3 wherein the solvent used is an alcohol and the catalyst used is an aryltrialkylammonium hydroxide.

5. The method of claim 4 wherein the alcohol is methanol and the catalyst is benzyltrimethylammonium hydroxide.

6. The method of claim 3 wherein the solvent is methanol and the catalyst is sodium sulfhydrate.

7. The method of making a 1,4-dithiol-2,3-butanediol comprising saturating an inert alcoholic solvent containing an alkaline catalyst with hydrogen sulfide, incrementally adding thereto butadiene dioxide while maintaining the temperature in the range of about 15° to 40° C., and separating the 1,4-dithiol-2,3-butanediol formed, the ratio of said solvent to said dioxide being at least about 12:1, and the amount of butane dioxide added being about one mol for each two mols of the hydrogen sulfide.

8. The method of claim 7 wherein the solvent is methanol and the catalyst is benzyltrimethylammonium hydroxide.

9. The method of claim 7 wherein the solvent is methanol and the catalyst is sodium sulfhydrate.

10. The method of claim 1 including the steps of reacting the separated 1,4-dithiol-2,3-butanediol with a water-soluble compound of a metal until the reaction is substantially completed, and separating the mercaptide formed.

11. The method of claim 10 wherein the compound is sodium hydroxide and the mercaptide formed is the disodium salt of 1,4-dithiol-2,3-butanediol.

References Cited

UNITED STATES PATENTS 3,462,496    8/1969    Fletcher et al. ____ 260—609 D

OTHER REFERENCES

Umbach et al.: "Anstrichmittel," 71 (1969), pp. 199–203.

Weissberger,: "Heterocyclic Compounds With Three and Four-Membered Rings," (1964), pt. 1, pp. 326–30.

LEWIS GOTTS, Primary Examiner

D. R. PHILLIPS, Assistant Examiner